Nov. 7, 1933.    R. T. WAITE    1,934,107
ADVERTISING APPARATUS
Filed Jan. 12, 1932    2 Sheets-Sheet 1

INVENTOR
R. T. Waite.
BY Lacey & Lacey
Attys

Nov. 7, 1933.     R. T. WAITE     1,934,107
ADVERTISING APPARATUS
Filed Jan. 12, 1932     2 Sheets-Sheet 2
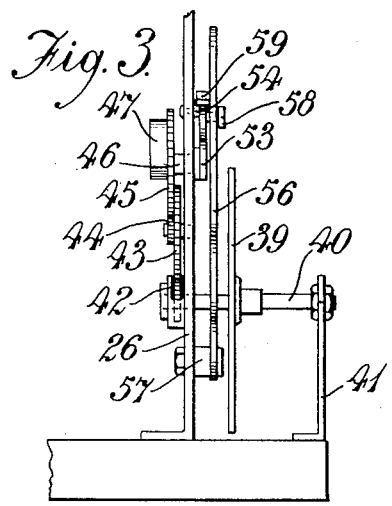
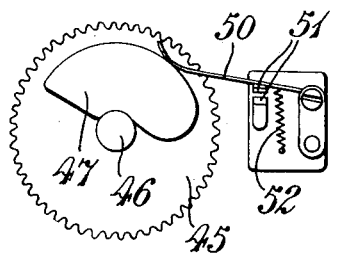
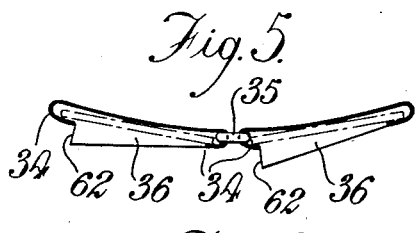
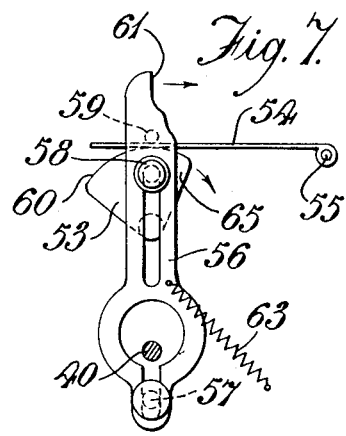
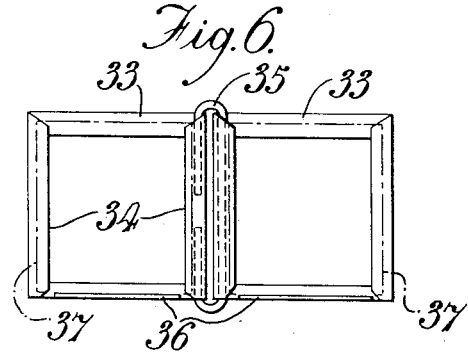
INVENTOR
R. T. Waite.
By Lacey & Lacey,
Attys Patented Nov. 7, 1933

1,934,107

UNITED STATES PATENT OFFICE 1,934,107

ADVERTISING APPARATUS

Robert Turner Waite, Blackpool, England, assignor of one-half to Robert Edwin Duckworth, Lytham St. Annes, England Application January 12, 1932, Serial No. 586,177, and in Great Britain September 17, 1931

5 Claims. (Cl. 88—28)

This invention relates to advertising apparatus of the kind intended for use in shop windows and the like and more especially to that of the kind in which a series of transparent slides are arranged in connection with a source of illumination, so that each of said slides is in turn brought into register with the source of illumination, thus producing an image of said slide upon a conveniently disposed screen.

The object of the present invention is to provide an extremely compact and simple form of projection apparatus in which the slides may readily be interchanged or replaced, which apparatus is practically noiseless in operation and is efficient in working.

In an advertising apparatus according to the invention, a plurality of interchangeable transparent slides or slide holders are arranged in the form of an endless chain and are adapted to pass in turn between a screen and a source of illumination so that the images of said slides are projected upon said screen. Preferably the ring is supported upon the face of a vertical cylinder by means of a guide flange and for projecting the slides in turn said chain is moved circumferentially in an intermittent manner by oscillating the lever mechanism which imparts a thrust on the chain only in the direction of motion of said chain. The slides may be carried in or by holders pivotally connected to adjacent holders, while each of said holders may be provided with a projection for engagement with the lever mechanism, the arrangement being such that the lever rises behind one of the projections and after moving the holders forward through a distance corresponding to one slide, said lever moves out of engagement with the projection so as to allow the slide to remain stationary for a period of time during which the image of the slide is projected upon the screen.

One embodiment of the invention is shown in the accompanying drawings, in which:—

Figure 3 is a side elevation of the means for moving the slides and controlling the lamp circuit;

Figure 4 shows diagrammatically the lamp controlling switch;

Figures 5 and 6 are plan and elevational views, respectively, of two slide holders; and Figure 7 is an elevation taken at right angles to Figure 3 showing the lever mechanism for moving the slide holders.

Figure 1:
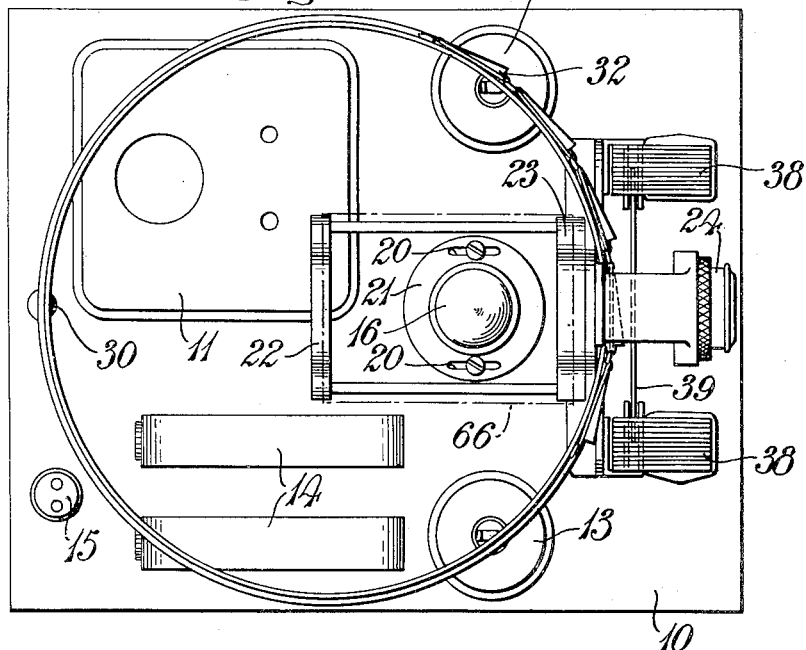
Figure 1 is a plan view of the complete projection apparatus.
Figure 2:
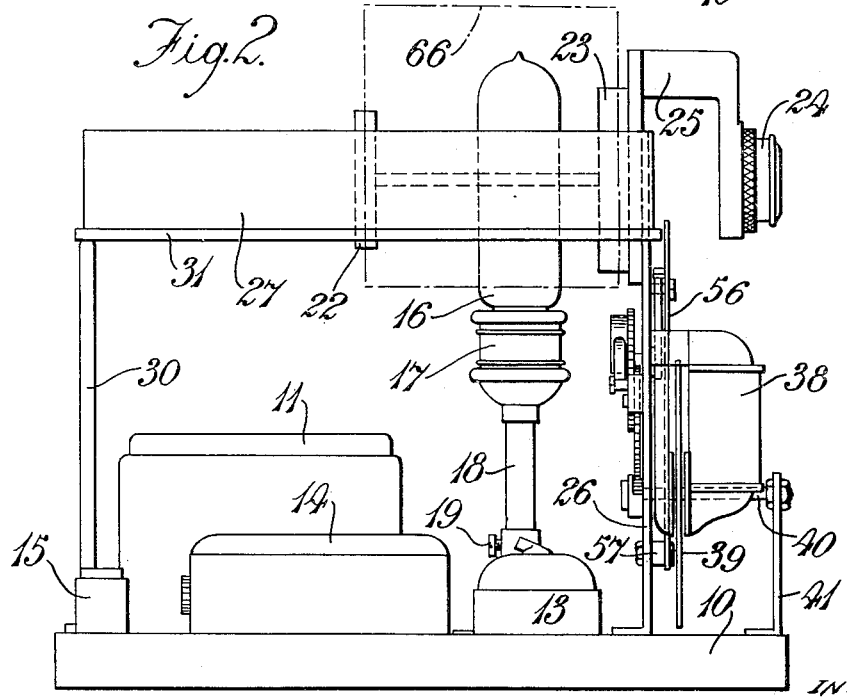
Figure 2 is a side elevation corresponding to Figure 1.

Referring more particularly to Figures 1 and 2, it will be seen that the projector is of compact form and is supported upon a base 10 which also carries the electrical control components comprising a time switch 11, a lamp control switch 12, a motor switch 13, fuses 14, and a supply plug socket 15. A projection lamp 16 is carried by a holder 17 which is adjustable vertically by means of a sliding joint 18 and set screw 19, while lateral movement of the lamp 16 is effected by means of slots 20 formed in a base-plate 21. The optical equipment is of standard form and comprises a concave mirror 22 and condenser 23 which serve to direct the light from the lamp 16 through a projection lens 24, the latter being carried by an inverted U-shaped bracket 25 forming also the mount for the condenser 23, said bracket 25 being supported by means of a plate 26 attached to the base 10.

To the upper portion of the plate 26 is attached a hollow cylinder or ring 27 which is supported at the rear of the device by means of a pillar 30, said ring being formed around its lower edge with an outwardly extending flange 31 and being suitably formed with an aperture adjacent to the condenser 23 in order to allow the passage of light. This cylinder 27 serves as a support for a series of slide holders, indicated generally at 32 and shown more particularly in Figures 5 and 6. Each of these holders is in the form of a link so that the whole series forms an endless chain which is moved intermittently around the cylinder 27 by means to be described, said holder comprising a substantially rectangular frame 33 bent over at its sides 34 to form housings for wire linking members 35, and provided at its lower edge with a shelf 36 for supporting the corresponding transparent slide, shown at 37 in broken lines. The shelf 36 is triangular in form and is shaped like a ratchet tooth.

The means for feeding the holders 32 around the cylinder 27 and also controlling the passage of current through the lamp 16 is driven continuously, preferably by means of an induction motor of known type the field system of which is indicated at 38 in Figures 1 and 2 but is omitted from Figure 3. The disc 39 of the motor is carried by a spindle 40 pivoted in the plate 26 and in a bearing bracket 41, the spindle 40 being connected by a compound gear wheel train 42, 43, 44, 45 with a cam shaft 46 also carried by the plate 26. The last wheel 45 of the train is formed with a cam 47 which engages the end portion of a contact lever 50 (see Figure 4), thus breaking the electric circuit through the lamp 16 at intervals by means of contacts indicated at 51, and a return spring 52. By this means the lamp 16 is extinguished while the slides 37 are moved in succession, into register with the optical axis.

The cam shaft 46 is provided at its other extremity with a sector-shaped cam 53 upon the periphery of which bears a lever 54 in the form of a strip pivoted to the plate 26 at 55. A slotted pawl 56 is supported in a lateral direction by means of a pin 57 upon the plate 26 and a crank pin 58 upon the cam 53, while vertical movement is controlled by means of a pin 59 which is fixed to the pawl 56 adjacent to its upper end and bears upon the lever 54. As the cam 53 is rotated continuously by the disc and as all parts of the curved portion 60 of the cam 53 are equidistant from the centre of rotation of said cam, the lever 54 will be held stationary in its raised position while the upper end 61 of the pawl 56 is moved laterally in a substantially horizontal direction by the action of the crank-pin 58. During this movement the upper end 61 engages the abutment portion 62 of the step 36 on one of the slide holders 32 so that the whole of the slides are moved round the cylinder 27 by an amount equal to the width of one slide. As the next slide 37 comes into position in front of the condenser 23 the pawl 56 is lowered under the influence of a tension spring 63 as the radial portion 64 of the cam 53 reaches the lever 54. The pawl 56 then returns to its lowered position and upon being raised as the second radial portion 65 becomes uppermost, the upper end 61 engages the step 36 on the next slide holder, and moves the chain of slide holders to the next position. The cam 47 is shaped so that the contacts 51 are apart when the holders 32 are in motion, thus extinguishing the lamp 16 until the next slide has been moved into position. Although the above mechanism has been described in this example for moving the slide holders 32, it will be readily understood that various other arrangements can be employed to produce the same effect.

The time switch 11 serves for controlling the main current supply to the device, e. g. so as to cause the projector to function at predetermined times or for given intervals, while a cover, indicated at 66, prevents the distribution of stray light from the lamp 16.

It will be observed that the device according to the invention is extremely simple in construction and operation, while the various slides carried by the holders 32 may be readily changed to provide a variety of projected advertising matter. Moreover, it is readily applicable for use with direct current by the substitution of a suitable motor for the induction motor shown in the drawings.

What I claim is:—

1. Apparatus of the character described including a stationary vertically disposed cylinder provided with a radial ledge, an endless chain of flexibly connected plate holders rotatably fitting about the cylinder and resting on said ledge to be slidably supported thereby, and feeding means engageable with said plate holders successively for intermittently rotating the chain.

2. Apparatus of the character described including a stationary vertically disposed cylinder provided with a radial ledge, an endless chain of flexibly connected plate holders rotatably fitting about the cylinder and resting on said ledge to be slidably supported thereby, feeding means engageable with said plate holders successively for intermittently rotating the chain, a source of illumination, a switch in the circuit of said source of illumination, and means for actuating the feeding means including a cam for operating said switch.

3. Apparatus of the character described including a stationary vertically disposed cylinder provided with a radial ledge, an endless chain of flexibly connected plate holders rotatably fitting about the cylinder and resting on said ledge to be slidably supported thereby, each of said plate holders being formed with a shelf to coact with the ledge and projecting radially therefrom to provide a shoulder, and feeding means engageable with said shoulders successively for intermittently rotating the chain.

4. Apparatus of the character described including a stationary vertically disposed cylinder provided with a radial ledge, an endless chain of flexibly connected plate holders rotatably fitting about the cylinder and resting on said ledge to be slidably supported thereby, a pivotally and slidably mounted pawl engageable with said holders successively for intermittently rotating the chain, means for rocking the pawl including a cam, a lever coacting with the cam, and means carried by the pawl to coact with said lever for guiding the free end of the pawl when engaged with any one of said holders in a straight path when the pawl is rocked.

5. Apparatus of the character described including a stationary vertically disposed cylinder provided with a radial ledge, an endless chain of flexibly connected plate holders rotatably fitting about the cylinder and resting on said ledge to be slidably supported thereby, a pivotally and slidably mounted pawl engageable with said holders successively for intermittently rotating the chain, a driven shaft having a crank for rocking the pawl, a cam on said shaft for elevating the pawl to active position, yieldable means for retracting the pawl, a pivoted lever coacting with the cam, and a pin on the pawl to coact with said lever for guiding the free end of the lever when engaged with any one of said holders in a straight path when rocked by said crank.

ROBERT TURNER WAITE.